United States Patent [19]

Kimmel

[11] 4,170,037
[45] Oct. 2, 1979

[54] LOCK-OUT LOGIC CIRCUIT FOR INVERTER PROTECTION

[75] Inventor: Donald S. Kimmel, Pittsburgh, Pa.

[73] Assignee: The United States of America as represented by the Secretary of the Interior, Washington, D.C.

[21] Appl. No.: 931,067

[22] Filed: Aug. 4, 1978

[51] Int. Cl.² .............................................. H02M 1/18
[52] U.S. Cl. ...................................... 363/57; 363/135
[58] Field of Search ............... 363/57, 58, 96, 98, 363/135, 136

[56] References Cited

U.S. PATENT DOCUMENTS

| | | | |
|---|---|---|---|
| 3,047,789 | 7/1962 | Lowry | 363/96 |
| 3,448,367 | 6/1969 | Corey | 363/58 |
| 3,657,631 | 4/1972 | Martens et al. | 363/26 |
| 3,718,853 | 2/1973 | Graf | 363/58 |
| 3,852,656 | 12/1974 | Bourbeau | 363/58 |
| 4,126,819 | 11/1978 | Stobbe et al. | 363/133 |

Primary Examiner—William M. Shoop
Attorney, Agent, or Firm—Thomas Zack; Donald A. Gardiner

[57] ABSTRACT

A lock-out control logic circuit for a feedback inverter system, which senses the load current in each load switching element of the inverter system and utilizes the sensed current through the presently conducting load switching element to inhibit the next firing of the presently non-conducting load switching element. Current transformers are inserted in series with each switching element and coupled to a CMOS logic circuit which inhibits the firing pulse to a non-conducting load switching element in the event a current conduction condition is sensed.

2 Claims, 10 Drawing Figures

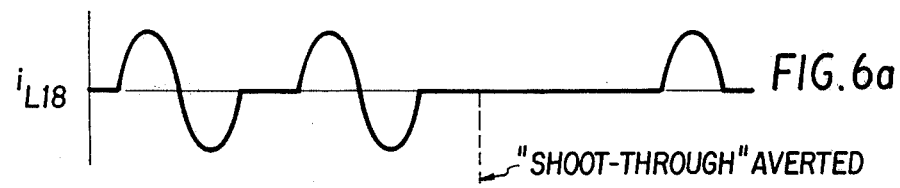
FIG. 6a
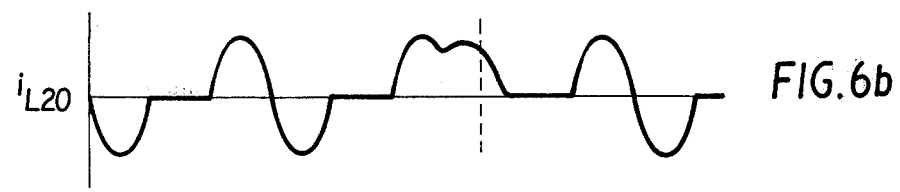
FIG. 6b
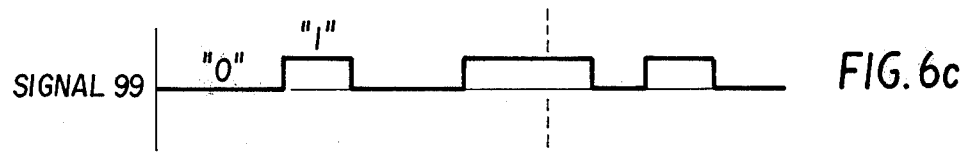
FIG. 6c
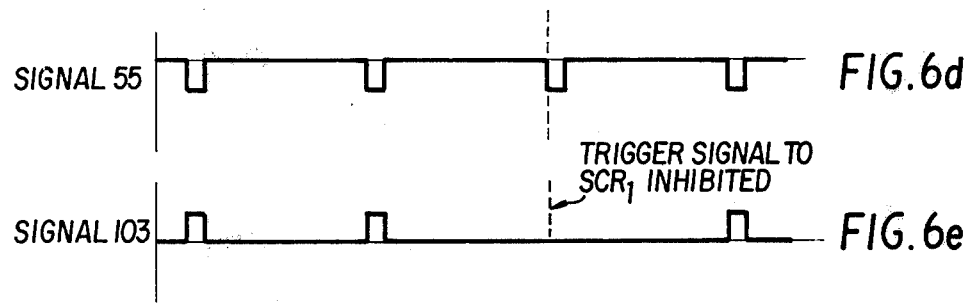
FIG. 6d
FIG. 6e

LOCK-OUT LOGIC CIRCUIT FOR INVERTER PROTECTION

BACKGROUND OF THE INVENTION

1. Field of the Invention

This invention relates to a lock-out logic circuit for use in conjunction with feedback inverter systems, and in particular, but not exclusively, resonant feedback inverter systems.

2. Description of the Prior Art

Various inverter systems have previously been proposed to convert the output of a direct current (d.c.) power source to an alternating current (a.c.). Generally, these systems employ a pair of commutating load rectifiers which are either self-commutated of the resonant-feedback type, or of the auxiliary impulse commutated type which are commutated by means of additional commutating rectifiers and an impulse forming circuit. Since this invention is directed to a lock-out circuit for a resonant feedback inverter system, the following discussion is limited to a description of this type of system. Examples of auxiliary impulse commutated inverter systems are found in U.S. Pat. Nos. 3,641,421; 3,852,657; and 3,919,620.

An example of a self-commutated resonant feedback inverter circuit was published by Mapham, "An SCR Inverter with Good Regulation and Sine Wave Output," IEEE Transaction on Industry and General Applications, IGA-3, No. 2, March/April, 1967, and is shown in FIG. 1 of this application. The operation of this circuit is as follows. When SCR1 is triggered, current flows from the supply E charging up capacitor C to a voltage approaching 2E. The current then reverses and flows back to the supply E via diode D1, and C discharges. During the reverse current flow, the rectifier SCR1 becomes reversed biased and is thereby turned off. Then SCR2 is triggered on and a similar cycle occurs in the lower half of the circuit, with a negative voltage pulse occuring across the capacitor C. SCR1 is then again triggered after SCR2 becomes reversed biased, and the cycle continues.

In reality, the output of the inverter circuit shown in FIG. 1, i.e. the voltage across capacitor C, is transformer coupled to a load either for isolation or voltage transformation purposes. The load across the output capacitor C therefore includes L2, the primary inductance of the load transformer, and R and C2 which represent the reflected load. However, the reflected load capacitance C2 may lower the resonant frequency of the inverter circuit sufficiently to cause an inverter malfunction if switching of the load or a change in the load occurs at a certain time in the half cycle. Specifically, if either of the load rectifiers, SCR1 or SCR2, is delayed in turning off while the other load rectifier commences conduction, simultaneous conduction by both load rectifiers occurs, which effectively short circuits the load and is known as "rectifier shoot-through." A shoot-through results in current levels far greater than those existing during normal operation, and can result in destruction of the load rectifiers.

SUMMARY OF THE INVENTION

Accordingly one object of this invention is to provide a novel lock-out logic circuit to protect the load switching elements of a feedback inverter system against the "shoot-through" phenomenum.

Another object is to provide a simple lock-out logic circuit which insures continued operation of inverters under conditions that could otherwise result in inverter failure.

A further object is to provide an improved lock-out logic circuit which may readily be adapted to many various control circuits.

These and other objects are achieved by providing a novel lock-out logic circuit which senses the load current in each load switching element and utilizes the sensed current through the presently conducting load switching element to inhibit the next firing of the presently non-conducting load switching element. Current transformers are inserted in series with each switching element and coupled to a CMOS logic circuit which inhibits the firing pulse to a non-conducting load switching element in the event a current conduction condition is sensed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
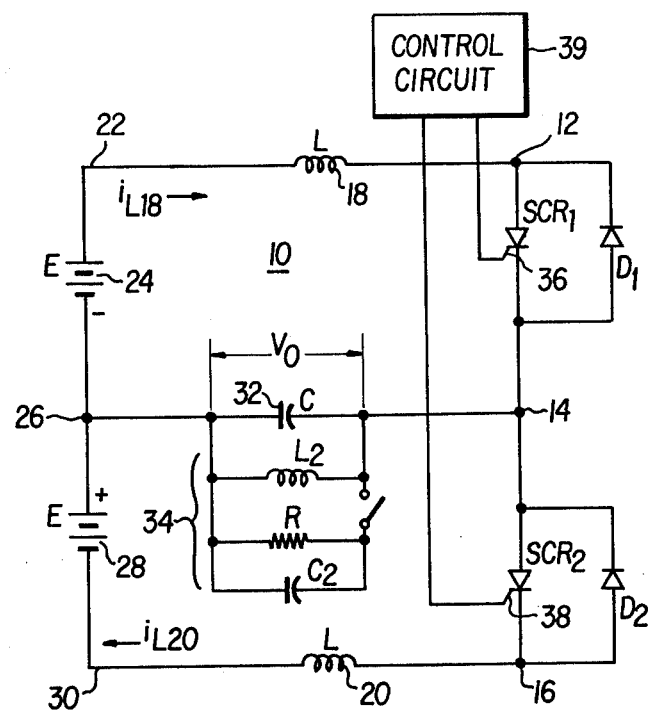
FIG. 1 is a circuit diagram of a resonant feedback inverter circuit employed in the prior art.

Referring now to the drawings, wherein like reference numerals designate identical or corresponding parts throughout the several views, and more particularly to FIG. 1 thereof, the inverter system 10 described above is seen to include the voltage source E, the inductor L, the load switching elements SCR1 and SCR2, the diodes D1 and D2, and the load capacitor C. Diode D1 is connected in parallel with SCR1, with the cathode of D1 connected to the anode of SCR1 at the junction 12, and the anode of D1 connected to the cathode of SCR1 at the junction 14. Similarly, diode D2 is connected in parallel with SCR2, with the anode of SCR2 and the cathode of diode D2 also connected to the junction 14, and the cathode of SCR2 and the anode of D2 connected to the junction 16. Inductors L are connected to the junctions 12 and 16, with the upper inductor L labeled as 18 and the lower inductor labeled as 20. The other side of the inductor 18 is connected at the junction 22 to the positive side of the voltage source E labeled 24, while the opposite side of the inductor 20 at the junction 30 is connected to the negative side of the voltage source E labeled 28. The negative side of the voltage source 24 is connected to the positive side of the voltage source 28 at the junction 26. A battery symbol is used to illustrate the voltage sources 24 and 28, but in an actual circuit, each voltage source is in fact a bank of electrolytic capacitors which also serve as part of an input filter to the resonant feedback inverter 10.

Between the junctions 14 and 26 is connected the output capacitor 32. The capacitor 32 is connected across a load indicated as 34, and which as described above usually includes the primary of an output transformer, and the reflected load, shown schematically as L2, and R, C2, as described above.

In operation, gate pulses are alternately applied to the gate terminals 36 and 38 of SCR1 and SCR2 respectively from a control circuit 39, discussed hereinafter in more detail. When SCR1 is triggered on, current flows from the voltage source 24 charging capacitor C to a voltage approaching 2E. This current then reverses and flows back to the supply via diode D1 and C thereby discharges. During the reverse current flow, turn-off time is presented to SCR1. Then SCR2 is triggered on, and a similar cycle occurs in the lower half of the circuit with the negative pulse of voltage appearing across C. SCR1 is then triggered again and so the cycle repeats.

Figure 2:
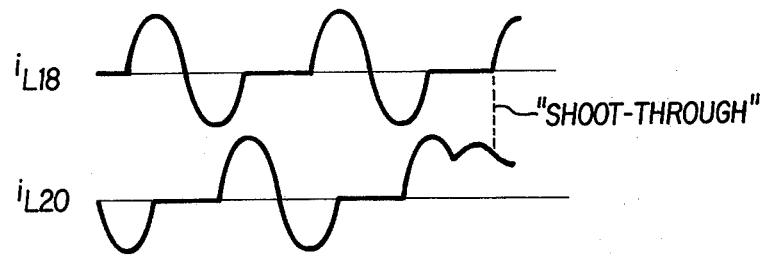
FIG. 2 is an illustration of waveforms found in the circuit of FIG. 1.

Selected current waveforms for the circuit of FIG. 1 are shown in FIG. 2. The upper trace corresponds to the current in the inductor 18 and includes the current through the parallel combination of SCR1 and D1. Similarly, the lower current trace of FIG. 2 illustrates the current through the inductor 20, i.e. the current through the parallel combination of SCR2 and D2. It is seen in FIG. 2 that positive currents are produced during the periods when SCR1 and SCR2 are conducting, while negative currents pass through the diodes D1 and D2. However, as shown in the bottom trace of FIG. 2, wherein an inverter malfunction is illustrated, a shorted output or inadvertent load switching during the conduction time of the switching element SCR2 results in an extended current conduction of this switching element, which when extended into the conduction period of SCR1, results in the "shoot-through" phenomenum discussed above.

Figure 4:
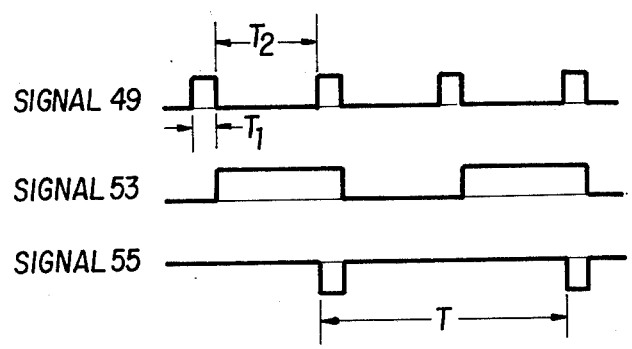
FIG. 4 is an illustration of waveforms found in the circuit of FIG. 3.
Figure 3:
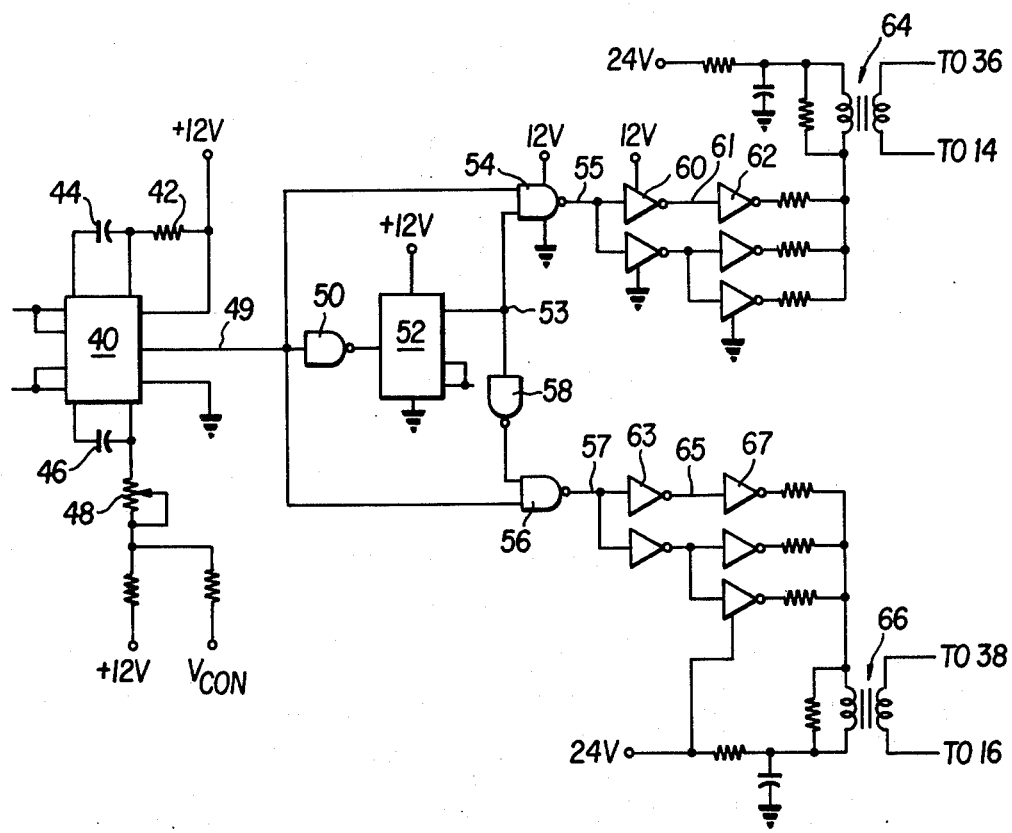
FIG. 3 is a circuit diagram of a typical control circuit for producing gate pulses to a resonant feedback inverter.

A typical control circuit 39 for producing appropriately phased gate pulses to the gate inputs 36 and 38 respectively of the switching elements SCR1 and SCR2 in the resonant feedback inverter is shown in FIG. 3. The integrated circuit labeled 40 is a dual monostable multivibrator that is connected as shown to operate as an astable multivibrator. The output 49 of the multivibrator 40 is high for a time period T1, as shown in FIG. 4, which time period is determined by the time constant of the resistance 42 and the capacitance 44. Ultimately, the time period T1 determines the amount of time the gate pulse is delivered to the gates 36 and 38 of the switching elements SCR1 and SCR2. As is also seen in FIG. 4, the output 49 of the multivibrator 40 is low for a time period T2 as determined by the capacitance of the capacitor 46, the resistance of the potentiometer 48, and the value of the control voltage $V_{CON}$. The $V_{CON}$ voltage input may be controlled by a feedback circuit (not shown) if it is desired to vary the output frequency of the gate pulses. The output 49 of the astable multivibrator 40 is inverted by the gate 50 and applied as a clock into one half of a dual "D" flip-flop 52 which is connected to operate as a "T" (trigger) flip-flop. The flip-flop 52 divides the frequency of the astable multivibrator 40 in half, and at the output 53 thereof there is produced a square wave signal which is applied to the dual input NAND gate 54 and an inverter 58. The output of the inverter 58 is applied to another dual input NAND gate 56. The NAND gate 54 and 56 also have applied the other inputs thereof the output 49 of the astable multivibrator 40. Thus, as also seen in FIG. 4, the output 55 of the gate 54 is a normally high pulse train having a negative going pulse width of approximately T1, while the output 57 of the gate 56 is likewise a normally high pulse train having negative going pulses which are spaced in phase 180° apart from the pulses at the output of gate 54. The outputs from the two NAND gates 54 and 56 are feed into inverter buffers, 60 and 63, which in turn have their output 61 and 65 fed into the output current amplifiers 62 and 67. It is noted that four inverter buffers 60 and 63, and 6 current amplifiers 62 and 67 are shown in FIG. 3 since these numbers of such circuits are contained in readily-available integrated circuit CMOS logic. The output of the current amplifiers 62 and 67 are resistively coupled to the primary winding of gate pulse transformers 64 and 66 respectively, with the output at the secondary winding of the transformer 64 applied to the gate 36 of SCR1 and the cathode junction 14 of SCR1, and the secondary winding of the transformer 66 connected to the gate 38 and the cathode junction 16 of SCR2.

Figure 5:
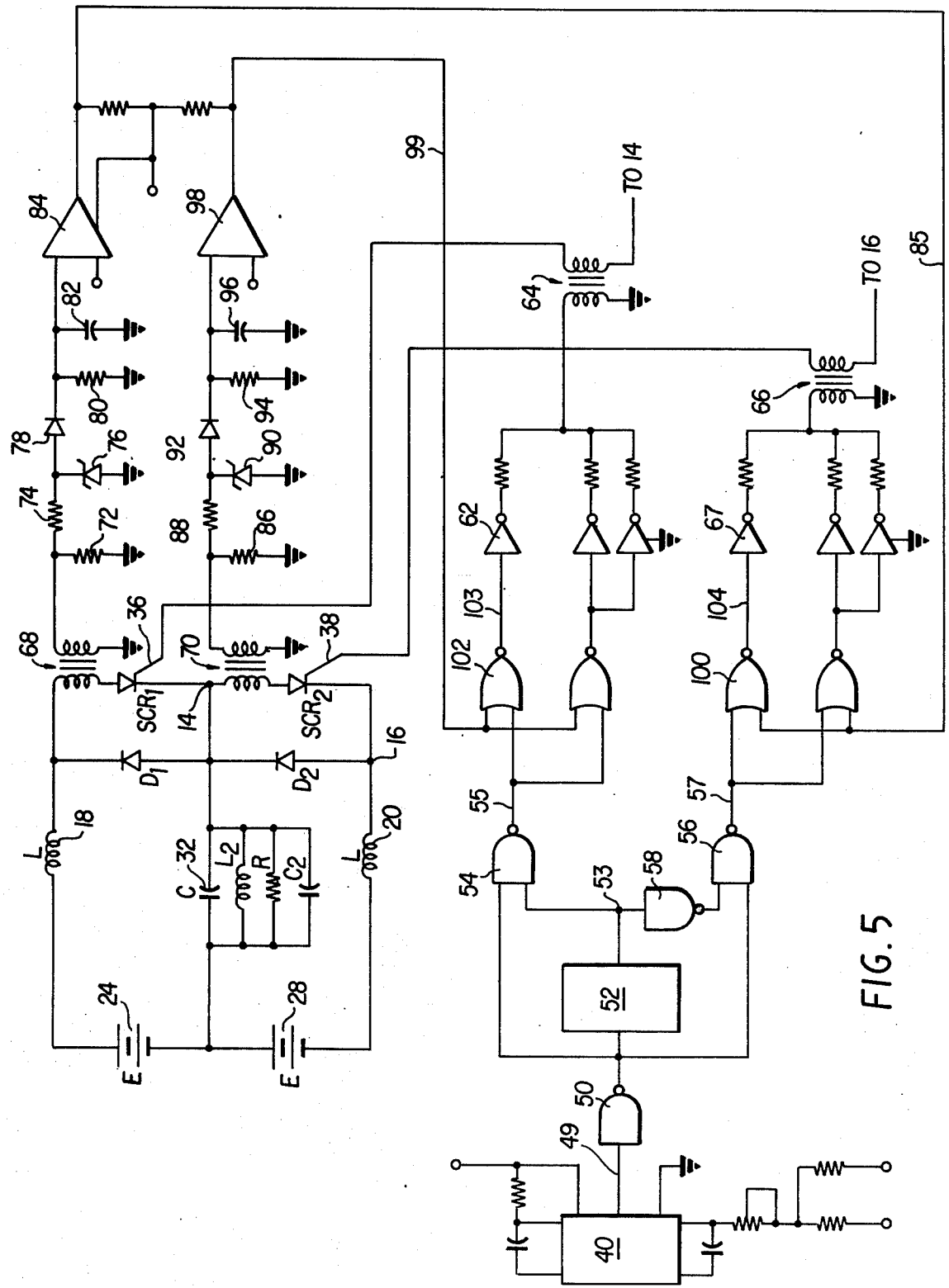
FIG. 5 is a circuit diagram of a lock-out logic circuit for inverter protection according to the invention; and, FIGS. 6a–6e is an illustration of waveforms found in the circuit of FIG. 5.

Turning now to FIG. 5, the essence of the present invention is shown to incorporate the basic circuit elements shown in FIGS. 1 and 3, and certain additional circuitry which senses the load current in the switching elements SCR1 and SCR2, converts the sensed current signal into a logic signal, and feeds this logic signal into a control circuit for producing the gate pulses to the resonant feedback converter to inhibit pulses to the non-conducting switching element. As shown in FIG. 5, current transformers 68 and 70 have the primary winding thereof respectively connected in series with the anodes of switching elements SCR1 and SCR2. Thus, the fact of current conduction through the primary of either of the transformers 68 and 70 produces a voltage across the resistors 72 and 86 respectively connected in parallel to these secondary windings. The voltage at the output of the secondary winding of the transformer 68 as it appears across the resistor 72 is clipped by the series combination of the resistor 74 and the zener diode 76. The diode 78, and the parallel combination of the resistor 80 and the capacitor 82 then stretches the trailing edge of a positive going sensed current pulse by the time constant of the resistance of resistor 80 and the capacitance of capacitor 82, thus allowing for the turn-off time of the switching element SCR1. The stretched transformer output is then fed to a Schmidt trigger circuit 84 having a "squared-up" output 85 which is compatible to drive one input of dual input NOR gate 100. Similarly, the output of the current transformer 70 is likewise evidenced as a voltage across the resistor 86, clipped by the resistor 88 and the zener diode 90, stretched by the combination of the diode 92, the resistor 94, and the capacitor 96, "squared-up" by the Schmidt trigger 98, and the output 99 thereof likewise applied to one input of the dual input NOR gate 102. The output 55 of the dual input NAND gate 54 is then applied as the other input to the dual input NOR gate 102, while the output 57 of the dual input NAND gate 56 is applied to the other input of the dual input NOR gate 100.

FIG. 6, similar to FIGS. 2 and 4, illustrate waveforms at various points in the circuit of FIG. 5, and demonstrates the protection afforded by lock-out logic circuit according to the invention. FIGS. 6a and 6b respectively illustrate the current waveforms through the inductors L18 and L20 as initiated by the load switching elements respectively associated with each of these inductors. A potential for the "shoot-through" condition is shown in FIG. 6b where the current through inductor L20 is shown as extending into what would otherwise be the current conducting time period of the inductor L18. However, according to the lock-out logic circuit of the invention, the existence of current through the inductor 20 is sensed by means of the transformer 70 and associated circuitry following thereafter, such that an inhibit signal 99 is produced at the output of the Schmidt trigger 98, as shown in FIG. 6c. The signal 99 results in inhibition of the gating signal 55 by means of the gate 102. Thus, as seen in FIG. 6e, the trigger signal 36 to the gate of SCR1 is inhibited by the output signal 99, thereby preventing a "shoot-through" condition.

In view of the above discussion, it is seen that the NOR gate 100 and 102 replace the buffer inverters 63 and 60 of the typical control circuit shown in FIG. 3, and provide a means for inhibiting the application of a gate firing pulse to the gate of a non-conducting switching element upon sensing the existence of current in a presently conducting switching element. It is therefore seen that the circuit of FIG. 5 fires each thyristor in the absence of current in the opposite thyristor, and neither requires an auxiliary starting circuit nor shut-down of the inverter system. Although the operation of this circuit can cause saturation of the output load transformer, whose primary inductance is represented by L2, since several or more half cycles may be skipped, this potential problem can be alleviated by placing a capacitor (not shown) in series with the primary winding of the transformer.

It is noted that the circuit as designed can be constructed generally of conventional components. In particular, the switching elements SCR1 and SCR2 can be silicon control rectifiers, thyristors, or the like, as long as the current carrying capability of these devices is compatible with the load requirements of the particular inverter application. It is also anticipated that standard CMOS digital logic can be employed, although other logic families such as TTL or the like can also be employed.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A lock-out logic circuit for a resonant-feedback inverter system wherein at least one pair of load bearing switching elements is provided, each of the load bearing switching elements of the at least one pair having a trigger input terminal to which is applied a trigger signal, comprising:

current sensing means for detecting the presence of a load current in the load bearing switching elements;

said current sensing means comprising at least one pair of current pulse transformers for each of said at least one pair of load bearing switching elements, each of said current pulse transformers having a primary winding in series connection with one of said load bearing switching elements, and a second winding; and said current sensing means further comprising at least one pair of pulse stretching circuits coupled to the secondary winding of said at least one pair of current pulse transformers, each pulse stretching circuit producing a pulse output whenever current exceeding a predetermined threshold exists in the primary of said current pulse transformers, said output of said pulse stretching circuit being maintained for a predetermined time period after the cessation of current through said current pulse transformers.

2. A lock-out logic circuit according to claim 1, wherein said inhibiting means comprises:

logic gates for logically combining the trigger input signal of each of said switching elements with the pulse output of the pulse stretching circuit corresponding to the other of said load bearing switching elements;

whereby the trigger signal to a particular load bearing switching element is inhibited by the pulse output of the pulse stretching circuit associated with the other of said at least one pair of load bearing switching elements when a current is sensed in said other of said load bearing switching elements.

* * * * *